United States Patent [19]

Kovacs

[11] Patent Number: 4,660,293
[45] Date of Patent: Apr. 28, 1987

[54] MEASURING INSTRUMENT FOR ANGLED MATERIAL

[76] Inventor: George Kovacs, 68 Nod Brook Rd., Wallingford, Conn. 06492

[21] Appl. No.: 786,071

[22] Filed: Oct. 10, 1985

[51] Int. Cl.[4] ............................................. G01B 9/10
[52] U.S. Cl. ..................................... 33/471; 33/495; 33/1 N; 33/536
[58] Field of Search ................ 33/1 N, 465, 458, 415, 33/403, 422, 495–500, 471, 534, 536, 538, 529

[56] References Cited

U.S. PATENT DOCUMENTS

| | | | |
|---|---|---|---|
| 740,742 | 10/1903 | Bush | 33/458 X |
| 2,495,609 | 1/1950 | Semrau | 33/534 X |
| 3,003,244 | 10/1961 | Fogliano | 33/458 X |
| 3,561,122 | 2/1971 | Beckwell | 33/471 |
| 3,623,231 | 11/1971 | Holt | 33/538 |

FOREIGN PATENT DOCUMENTS

| | | | |
|---|---|---|---|
| 90979 | 11/1921 | Switzerland | 33/403 |
| 173780 | 3/1935 | Switzerland | 33/471 |
| 187155 | 2/1937 | Switzerland | 33/403 |
| 341093 | 10/1959 | Switzerland | 33/471 |
| 1134676 | 11/1968 | United Kingdom | 33/471 |

Primary Examiner—Harry N. Haroian
Attorney, Agent, or Firm—Robert A. Seemann

[57] ABSTRACT

The angle gauge employs pivoted, straight edge arms having indicia therealong to determine length of the arms of bent or angled material as measured from the virtual apex of the angle of bend regardless of the radius of bend. Angle indicia is also provided at the pivot for determining the angle of bend.

7 Claims, 8 Drawing Figures

FIG. 7
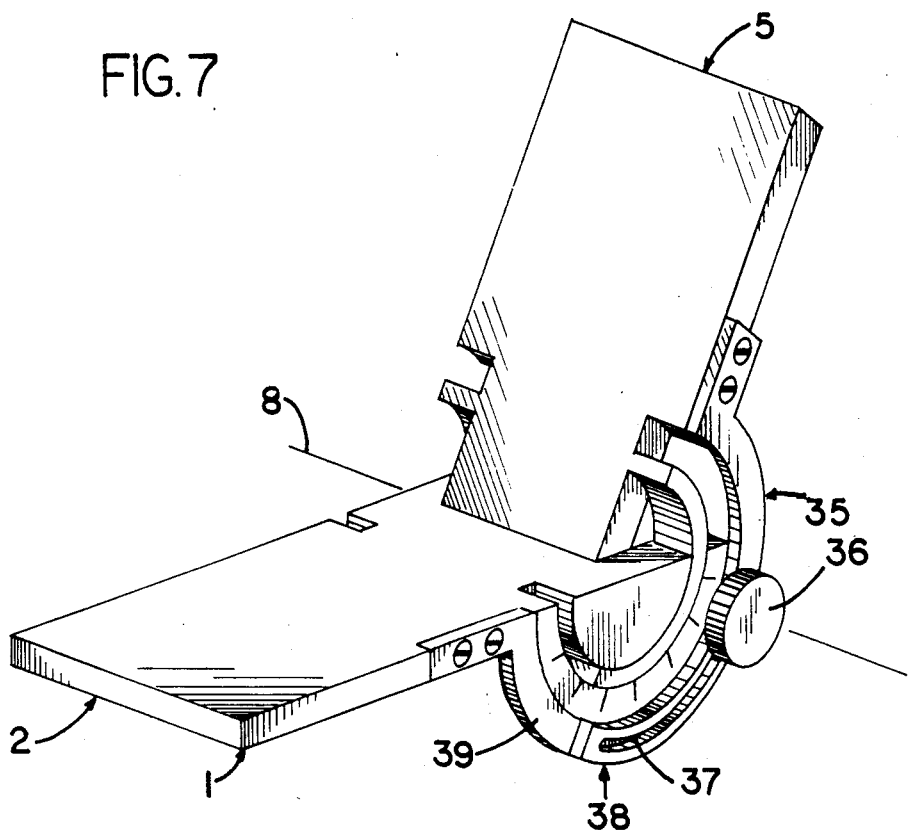
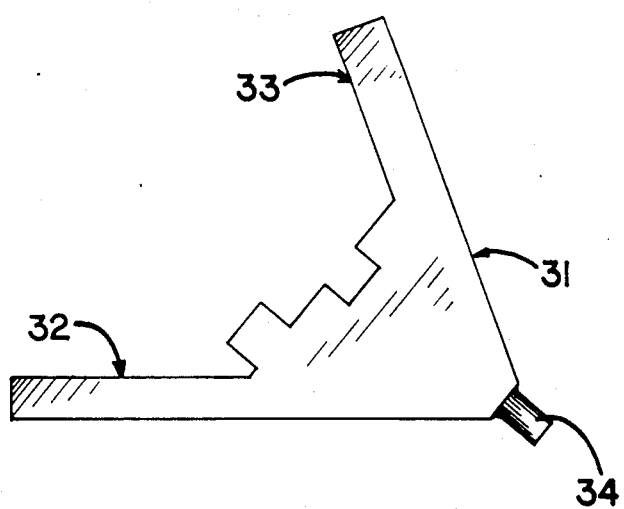
FIG. 8

MEASURING INSTRUMENT FOR ANGLED MATERIAL

BACKGROUND OF THE INVENTION

1. Field of the Invention

The present invention relates to pivoted, straight edge measuring means and more particularly to an instrument for determining length along a side of bent material, as measured from the virtual apex of the angle of bend regardless of the radius of the bend, and optionally for measuring the degree of that angle of bend.

2. Background Information

There has been a long time need for an instrument for measuring the length of a leg of bent material such as sheet metal, when the measurement must be taken from the virtual apex of the angle to which the material is bent. The apex, for all practical purposes is at an imaginary location that is beyond the ending of the joined legs. Putting it another way, the apex of the radius of the bend can be expected to fall short of the apex of the angle, unless the radius is "0" and the bend therefore perfectly angular.

Knowledge of the leg's length at its surface is required for sheet metal manufacture of modular subassemblies for enclosures having a plurality of flat sides. In order to approach perfect fit, one would want to be able to have as one reference, this geometrical constant which is unaffected by the slight variations that occur in bend radius from sheet to sheet.

It is often additionally advantageous to know the bend angle of the material so that it can be compared with the angles formed between other sides of the enclosure, in order to provide a symetrically formed enclosure.

One method presently used to make the measurement involves laying the bent material on a large flat surface so that the outer face of one leg of the bend is in intimate contact with the flat and then bringing a straight edge ruler to the other leg's face, holding it perpendicular to the angle of bend axis of rotation, sliding it down along the inclined face until it just meets the flat surface thus forming the angle of bend between the straight edge ruler and the flat plate.

This is not as easy a task as it may seem for a single operator. If the bent sheet metal module is light weight, the weight of the ruler against the inclined face will tend to shove the material out of position. The operator must simultaneously position the ruler, hold the sheet metal which may also deform under the weight of the ruler and take a measurement reading.

If the item to be measured is large and cannot be placed on a table to be measured, the operator has to hold two rulers in a plane which is perpendicular to the bend angle's axis of rotation, against the two outer faces of the bent material, and manipulate them until they just meet at the virtual point of intersection of the two faces without distorting the faces, and then take the measurement reading.

There are instruments presently available which can be pressed into service to take the type of measurement herein discussed but they have inherent limitations which prevent their use for all but the larger bend radiuses which may be encountered.

For example; The COMBINED PROTRACTOR AND RULE of W. S. Adams, U.S. Pat. No. 999,725, patented Aug. 8, 1911 includes a pair of hinged legs, graduated along their length for establishing measurements and having locator edges which physically intersect the pivotal connection. This instrument may be used to make the measurements under discussion above, by placing the edges which intersect the pivotal connection, against and parallel to the two angled faces and along a plane perpendicular to the bend angle's axis of rotation. The scale values other than "0" commence at the axis of rotation but values may be interpolated from them.

The instrument also includes a protractor scale attached to one of the hinged legs, centered on the axis of rotation, and a reference mark on the other leg for registering the angle to which the edges are positioned.

The Adams instrument and those of its type cannot however provide all the measurement service for which the present invention is intended. Specifically, it cannot measure materials having the shorter bend radiuses because the smaller the bend radius the closer the apex of the radius approaches to coinciding with the apex of the bend angle. An interference will therefore occur between portion of the hinge and/or protractor rule means and the apex of the material's bend radius.

U.S. Pat. No. 3,521,365 awarded July 21, 1970 to J. E. O'Neal for a DUCT MEASURING INSTRUMENT, reduces chance of interference between the hinge and bend radius by displacing the axis of rotation of the instrument's legs from their locator surfaces by the thickness of the duct material for which measurements are taken. By providing a measured value which is adjusted for the thickness of the duct material, the O'Neal invention defeats the purpose of the present invention.

SUMMARY OF THE INVENTION

In view of the foregoing it is one object of this invention to provide an instrument for measuring the distance from the virtual apex of the angle of bend of bent material to a point on a leg of the bent material.

It is another object of this invention to provide an instrument for measuring the distance from the virtual apex of the angle of angled material to a point on a face of the material without sufficient interference occuring between portions of the instrument and the apex of the material's angle that would unreasonably affect the instrument's accuracy.

It is another object of the invention to provide an invention of the character described which permits an operator to take the measurements described with minimum effort and with minimum stress applied to the material under measurement.

It is yet another object of the invention to provide an invention of the character described which also provides measure of the angle of bend of the angled material Other objects and advantages of the invention will become readily apparent to persons skilled in the art from the ensuing description.

Briefly, in accordance with the invention there is provided an instrument for determining the length along the surface of a side of angled material, as measured from the virtual apex of the material's angle, taken radially, perpendicular to the axis of rotation. A first and a second leg, each having locator surfaces are attached at a first end of each by a hinge in such a manner that the locator surfaces are coplanar with the instrument's legs' axis of rotation and in the same plane when rotated to a straight angle. At least one leg includes indicium representing a reference distance between the indicium and the legs' axis of rotation, in a direction normal to the axis of rotation. No portion of the hinge extends above the planes of the locator faces in a manner which is in interference with a bend radius of angled material when the locator faces are in contact with and parallel to both surfaces of the angled material for taking measurement. There is provision for a radially graduated scale measuring means attached to the legs for visible indication of the angle formed by the two sides of angled material under measurement. There is also provision for locking means to hold the instrument's legs at a desired angle.

BRIEF DESCRIPTION OF THE DRAWINGS

FIG. 7 shows another embodiment.

FIG. 8 shows a workpiece adapted to be measured by the invention.

DESCRIPTION OF THE PREFERRED EMBODIMENTS

Figure 1:
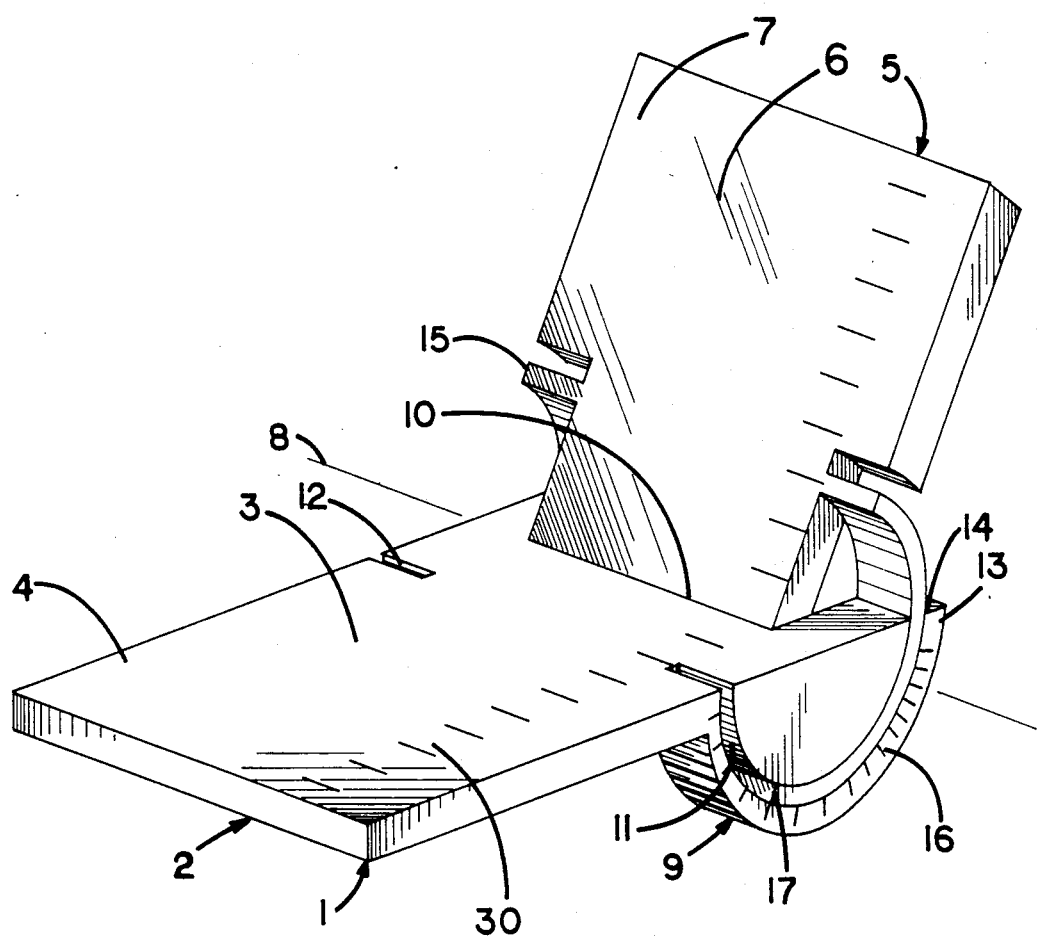
FIG. 1, 2 and 4 are axonometric views including the top, front and left side of three embodiments of the invention.

Before explaining the invention in detail it is to be understood that the invention is not limited in its application to the details of construction and arrangements of parts illustrated in the drawings since the invention is capable of other embodiments and of being practiced or carried out in various ways. It is also to be understood that the phraseology or terminology employed is for the purpose of description and not of limitation.

Referring to the drawings, in which like parts are similarly designated:

FIG. 1 illustrates a preferred embodiment in perspective view, in which there is shown a measuring instrument 1 for determining the length along the surface of a side of angled material as measured from the virtual apex of the material's angle. First leg 2 includes includes locator surface 3 on its face 4. Second leg 5 includes locator surface 6 on its face 7. Both locator surfaces are coplanar with axis of rotation 8 and, when oriented to a straight angle with each other are in the same plane.

First leg 2 includes an extending portion 9 which extends below locator surface 3, and beyond end 10 of the leg. The extended portion 9 includes radial slot 11 which also has axis of rotation 8 as its central axis. Slot 11 opens 12 to the locator plane foward of the axis and again, 14 near the rearward end 13 of the extended portion 9. Although the locator surface 3 is shown to cover face 4 for the full length of leg 2, this need not be the case for proper utilization of the instrument as will be explained later.

Second leg 5 includes curved extension 15, which has the same axis of rotation 8 as slot 11. Extension 15 slides in slot 11, supporting the first and second legs for rotation about axis 8, with the planes represented by locator surfaces 3 and 6 intersecting along a line which corresponds with axis 8.

Graduated scales 30 are provided on the surfaces 6 and 3 of legs 2 and 5 to measure length along the surface of a side of the bent material. Radially graduated scale 16 and reference mark 17 are included on the margins of the slot and curved extension where they provide visible indication of the angle to which the legs may be set.

Figure 3:
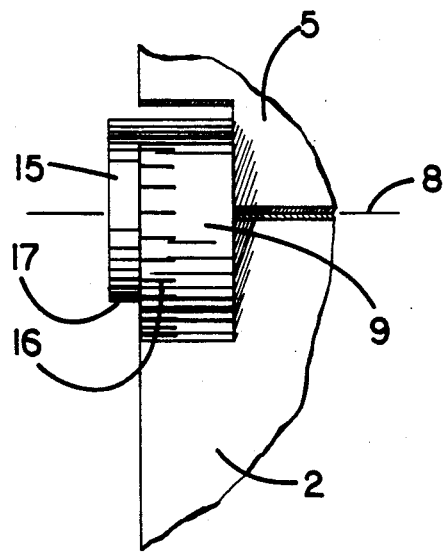
FIG. 3 is an axiometric bottom view of a portion of the invention which includes a scale for measuring angle of bend.

It will be understood that the curved extension may be formed with an extended margin as shown in FIG. 3, having the reference mark 17 on its outer diameter, and the graduated scale 16 located on the outer diameter of extending portion 9, so that visible indication of the angular setting is visible from the back of the instrument. Furthermore the instrument's legs can be made of a transparent, durable material such as Dupont brand Lucite, so that measurements according to scales 30 may be taken through the device so as to be visible from the back.

For purpose of continuing explanation, the front of the instrument may be considered to be the side having the locator surfaces.

Figure 2:
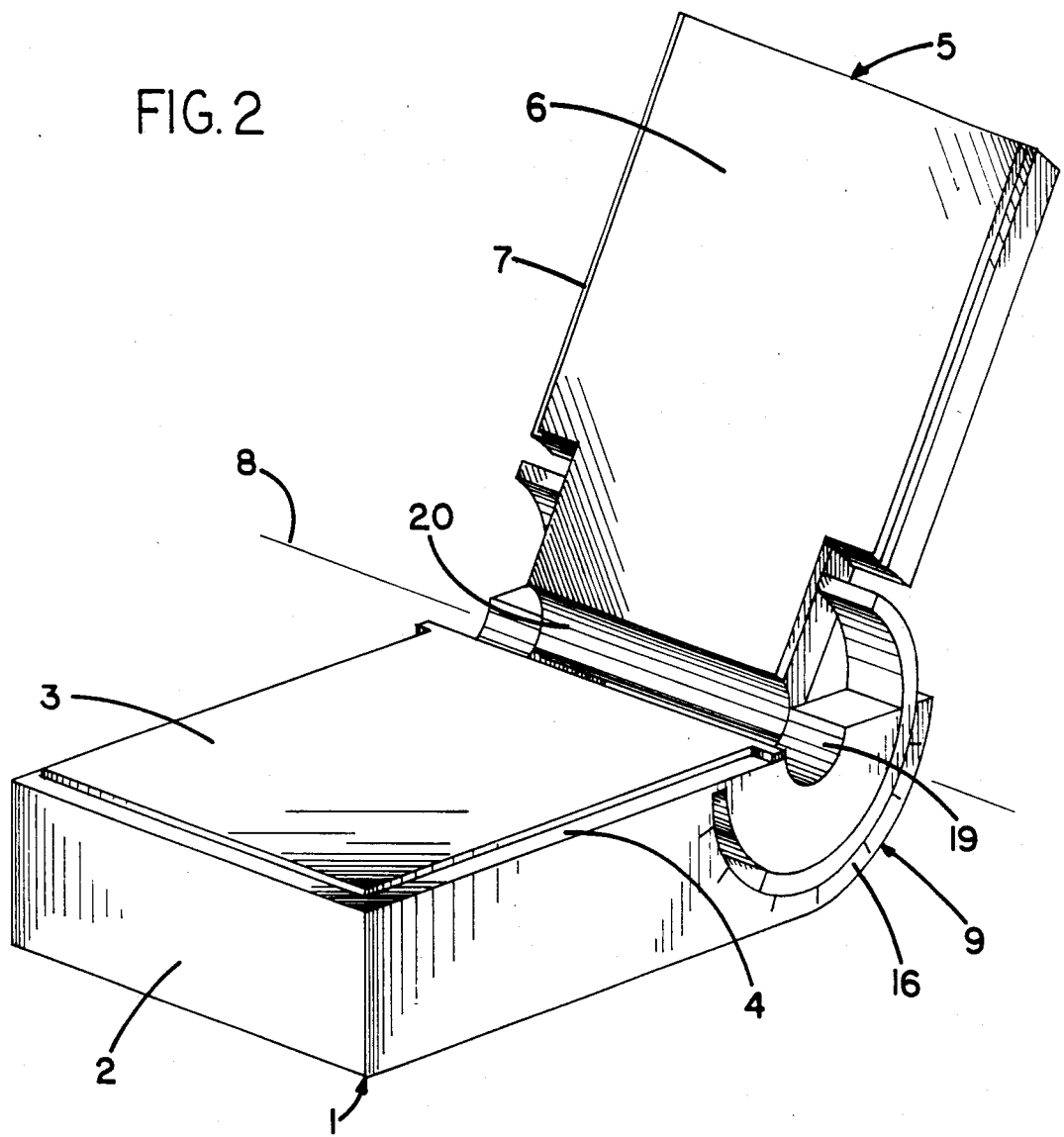
Figure 6:
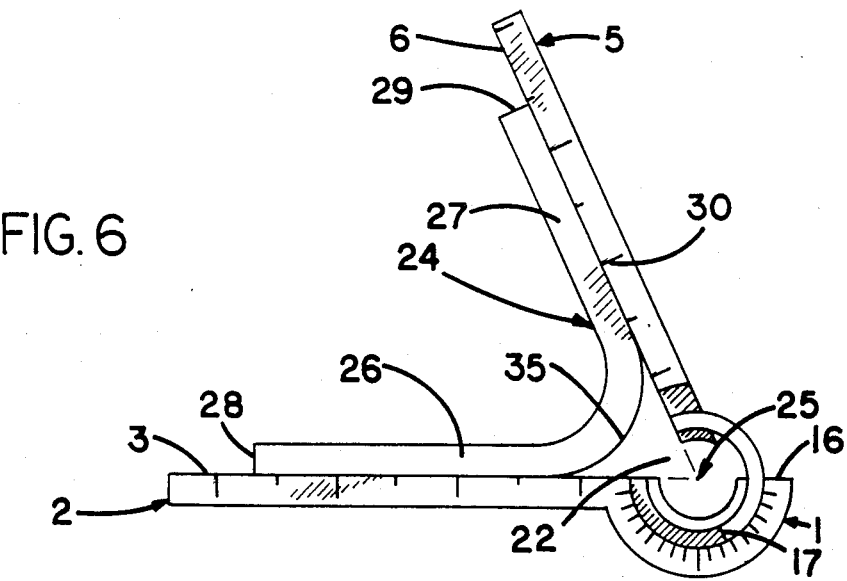
FIG. 6 is an orthographic front view of one embodiment with a bent piece of material under measurement.

In FIG. 2, first leg 2 is thicker so that it is one with extended portion 9. Slot 11 stops short of face 4, reducing the limit of rotation by a few degrees but protecting the slot from contamination. Locator surfaces 6 and 7 rise above leg faces 4 and 5 respectively. As differentiated from the embodiment of FIG. 1, while the locator surfaces have their planes intersecting along axis of rotation 8, the surfaces themselves clearly stop short of the radius due to first leg's radial trough 19 centered on axis 8 and chamfer 20 on the second leg. In FIG. 6 as well, locator faces 3 and 6 fall short 22 of the region of the axis of rotation. The axis of rotation 8 coincides with location 25 as will be explained later.

Figure 4:
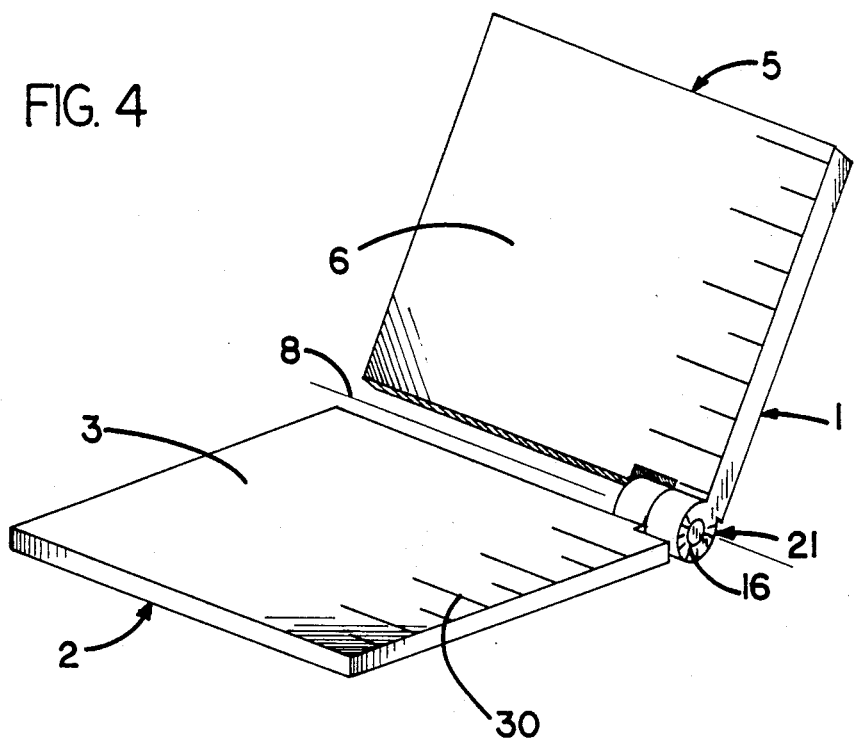

In the embodiment of FIG. 4, hinge 21 with its axis of rotation 8 coplanar with the two locator surfaces 3 and 6, extends along only a portion of the width of the locator faces. Later this will be shown to allow measurement without interference by the hinge. Radial scale 16 may also be incorporated in hinge 21.

Figure 5:
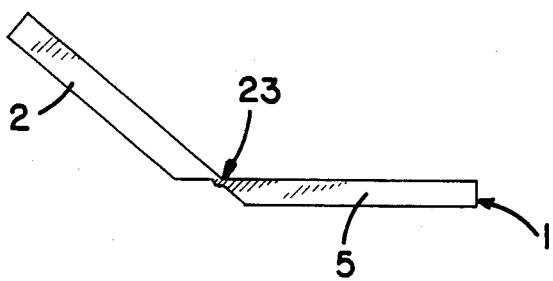
FIG. 5 is an orthographic front view of one embodiment incorporating a plastic hinge.

The embodiment illustrated in FIG. 5 includes a flexible plastic hinge 23 which has its axis of rotation coplanar with the locator surface planes. As with hinge 24 of FIG. 4, this hinge extends along only a portion of the width of the locator faces.

Turning now to how the present invention is employed: FIG. 6 shows a bent sheet metal part 24. The lengths of its legs are 3¾" for leg 26 and 3½" for leg 27 when measured between their respective ends 28 and 29 and the virtual apex 25 of the angle of bend.

Legs 2 and 5 of the instrument 1 are positioned on part 24 so that their locator faces 3 and 6 are in contact with and parallel to the surfaces of the legs of the part. The virtual apex 25 of the angle of bend of the part under measurement will automatically coincide with the instrument's legs' axis of rotation 8. In the example of FIG. 6, legs 2 and 5 of the instrument have known lengths of 4" as measured between their ends and their axis of rotation. It is a simple matter, then to add or subtract the difference between the known standard of 4", using a ruler or other measuring means to obtain the data needed to complete the calculations. Measurement of material having legs shorter than the standard 4" is further aided by progressive scale marking 30 along a portion of the length of the instruments legs. The visible length of scale is subtracted from the standard 4" to obtain the length of a part's leg. The scale's virtual zero value originates at the axis of rotation, although it may not be actually printed or scribed on the leg all the way down to the zero figure.

Such marking 30 is also seen on the front of the instrument in FIG'S. 1 and 4.

The angle of bend of the sheet metal registers on scale 16, denoted by reference mark 17.

Plastic hinge 23, of FIG. 5 and hinge 21 of FIG. 4, are located adjacent to the part of the locator surface which will be positioned in contact with the surfaces of the part to be measured. They therefore do not interfere with the apex 25 of the bend which would extend below their outer diameter when part 26 is seated in the instrument for measurement.

In FIG. 7, the embodiment shown includes locking means 38 for holding the instrument's locator surfaces at a desired angle, for example for use as a constant measuring reference or to carry away a measurement taken. Thumb screw 36, mounted through slot 37 in curved, flexible locking plate 35 serves to clamp plate 35 against curved anvil 39 to provide a secure lock when needed.

FIG. 8 shows a machined, angled part 31 with legs 32 and 33 identical in length to legs 26 and 27 of bent sheet metal part 24, when measured according to the same parameters. The machined part, however includes a small peg 34 centered on the virtual apex of the angle formed by the surfaces of the part's legs. Measuring this part, however presents little problem when the instruments as described in FIG. 6, 4 or 2 are employed because clearance for the peg is provided even though it protrudes into the region of the instruments axis of rotation.

From the foregoing it will be seen that the invention provides an instrument for measuring the distance from the virtual apex of the angle of bend of bent material to a point on a leg of the bent material without sufficient interference occuring between portions of the instrument and the apex of the materials bend angle to unreasonably affect the instrument's accuracy. It also provides for measure of the angle of bend of the material and to permit an operator to take the measurements with minimum effort and minimum stress applied to the material under measurement.

Although the present invention has been described with respect to details of certain embodiments thereof, it is not intended that such details be limitations upon the scope of the invention except insofar as set forth in the following claims.

I claim:

1. An instrument for determining length along the surface of a side of angled material, as measured from the virtual apex of the material's angle, radially and perpendicular to the angle's axis of rotation, said instrument comprising:
    a first leg having a first end, a second end, a first side and a second side, and a locator surface which occupies a portion of the distance between the first and second end and the first and second side,
    a second leg having a first end, a second end, a first side and a second side, and a locator surface which occupies a portion of the distance between its first and second end and its first and second side,
    hinge means attached to the first end of each leg for rotation of the instrument's legs, each locator surface is coplanar with the instrument's legs' axis of rotation and oriented so that said locator surfaces are in the same plane when rotated to a straight angle,
    said hinge means is so disposed that no portion of itself extends above the planes of said locator faces in a manner which would be in interference with a bend radius of angled material when said locator faces are in contact with with and parallel to both surfaces of the angled material for taking measurement,
    the width of at least one locator surface, as measured parallel to the installment's leg's axis of rotation, is sufficient to orient and maintain that surface coplanar with the surface of the angled material it is placed in contact with for taking measurement,
    at least one leg includes indicium representing a reference distance on the locator surface plane between said indicium and the legs' axis of rotation, in a direction normal to the axis of rotation.

2. The instrument as recited in claim 1, wherein said hinge means further comprises:
    a portion of the first side of said first leg extending beyond the first end, said portion including,
    a circular slot having its axis of rotation coincident with the instrument's legs' axis of rotation, and an opening toward the locator plane face at the extension,
    a curved extension, projecting from the first side of said second leg said extension having its axis of rotation coincident with the instrument's axis of rotation and adapted for sliding within the circular slot for rotation of the legs and,
    a portion of the second side of said first leg extending beyond the first end, said portion including,
    a circular slot having its axis of rotation coincident with the instrument's legs' axis of rotation, and an opening toward the locator plane face at the extension,
    a curved extension, projecting from the second side of said second leg said extension having its axis of rotation coincident with the instrument's axis of rotation and adapted for sliding within the circular slot for rotation of the legs 3. The instrument as recited in claim 2 wherein no portion of its locator faces extend into the region which immediately surrounds its legs' axis of rotation, so that said instrument will not be in interference with a portion of the angled material which may extend through the instrument's axis of rotation when said angled material is coupled with the instrument for taking measurement.

4. An instrument for determining length along the surface of a side of angled material, as measured from the virtual apex of the material's angle, radially and perpendicular to the angle's axis of rotation, said instrument comprising:
    a first leg having a first end, a second end, a first side and a second side, and a locator surface which occupies a portion of the distance between the first and second end and the first and second side,
    a second leg having a first end, a second end, a first side and a second side, and a locator surface which occupies a portion of the distance between the first and second end and its first and second side,
    hinge means attached to the first end of the first side of each leg for rotation of the instrument's legs, each locator surface is coplanar with the instrument's legs' axis of rotation and oriented so that said locator surfaces are in the same plane when rotated to a straight angle,
    the width of at least one locator surface, as measured parallel to the instrument's leg's axis of rotation, is sufficient to orient and maintain that surface coplanar with the surface of the angled material it is placed in contact with for taking measurement, at least one leg includes indicium representing a reference distance on the locator surface plane between said indicium and the legs' axis of rotation, in a direction normal to the axis of rotation.

said locator surfaces are wider than the hinge means to permit positioning the instrument with said locator faces in contact with and parallel to both surfaces of the angled material, whereby said center of rotation of the instrument's legs and angled material share the same axis, without interference between the hinge and bend radius of the angled material.

5. The instrument as recited in claim 1, 2, 4, or 3, wherein said indicium includes:

progressive scale marking commencing close to the first end of a leg and ending at the second end with its virtual zero value at the plane that includes the instruments's axis of rotation and a normal to the locator surface, said leg is transparent to permit reading of the marking by viewing it through the leg.

6. The instruments as recited in claim 5, further comprising: means for temporarily locking the legs at the angle formed between them when said locator faces are in contact with and parallel to both surfaces of the angled material for taking measurement.

7. The instrument as recited in claim 4 wherein no portion of its locator faces extend into the region which immediately surrounds its legs' axis of rotation, so that said instrument will not be in interference with a portion of the angled material which may extend through the instrument's axis of rotation when said angled material is coupled with the instrument for taking measurement.

* * * * *